United States Patent
Kim et al.

(10) Patent No.: US 9,125,539 B2
(45) Date of Patent: Sep. 8, 2015

(54) ROBOT CLEANER AND CONTROLLING METHOD OF THE SAME

(75) Inventors: Yiebin Kim, Seoul (KR); Seungmin Baek, Seoul (KR); Yoojin Choi, Seoul (KR); Vadim Lutsiv, St. Petersburg (RU); Victor Redkov, St. Petersburg (RU); Alexey Potapov, St. Petersburg (RU); Seongsoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 454 days.

(21) Appl. No.: 13/809,530

(22) PCT Filed: Jul. 5, 2011

(86) PCT No.: PCT/KR2011/004914
§ 371 (c)(1),
(2), (4) Date: Jan. 10, 2013

(87) PCT Pub. No.: WO2012/008703
PCT Pub. Date: Jan. 19, 2012

(65) Prior Publication Data
US 2013/0116825 A1    May 9, 2013

(30) Foreign Application Priority Data
Jul. 12, 2010  (KR) .................. 10-2010-0067112

(51) Int. Cl.
*G06K 9/00* (2006.01)
*A47L 11/20* (2006.01)
(Continued)

(52) U.S. Cl.
CPC ............... *A47L 11/20* (2013.01); *B25J 13/08* (2013.01); *G05D 1/0231* (2013.01); *G05D 1/0246* (2013.01); *G05D 1/0274* (2013.01); *G06K 9/00664* (2013.01); *G06K 9/4671* (2013.01); *G06K 9/6211* (2013.01);
(Continued)

(58) Field of Classification Search
None
See application file for complete search history.

(56) References Cited

U.S. PATENT DOCUMENTS

| 2007/0286526 A1* | 12/2007 | Abousleman et al. | 382/284 |
| 2009/0190798 A1* | 7/2009 | Lee et al. | 382/103 |
| 2010/0228394 A1* | 9/2010 | Yi et al. | 700/253 |
| 2013/0116826 A1* | 5/2013 | Kim et al. | 700/259 |

FOREIGN PATENT DOCUMENTS

| KR | 10-2002-0081035 A | 10/2002 |
| KR | 10-2007-0066192 A | 6/2007 |
| KR | 10-2010-0031277 A | 3/2010 |
| WO | WO 03-064116 A2 | 8/2003 |

OTHER PUBLICATIONS

Choi et al. (Jun. 2010) "CV-SLAM using ceiling boundary." Proc. 2010 IEEE Conf. on Industrial Electronics and Applications, pp. 228-233.*

Jeong et al. (Oct. 2006) "Visual SLAM with line and corner features." Proc. 2006 IEEE/RSJ Int'l Conf. on Intelligent Robots and Systems, pp. 2570-2575.*

(Continued)

*Primary Examiner* — Barry Drennan
(74) *Attorney, Agent, or Firm* — Dentons US LLP

(57) ABSTRACT

Disclosed are a robot cleaner and a method for controlling the same. A plurality of images are detected through an image detecting unit such as an upper camera, and two or more feature points are extracted from the plurality of images. Then, a feature point set consisting of the feature points is created, and the feature points included in the feature point set are matched with each other. This may allow the robot cleaner to precisely recognize a position thereof. Furthermore, this may allow the robot cleaner to perform a cleaning operation or a running operation by interworking a precisely recognized position with a map.

12 Claims, 7 Drawing Sheets

(a)

(b)

(51) Int. Cl.
  *G05D 1/02* (2006.01)
  *B25J 13/08* (2006.01)
  *G06K 9/46* (2006.01)
  *G06K 9/62* (2006.01)

(52) U.S. Cl.
  CPC .... *A47L 2201/04* (2013.01); *G05D 2201/0203* (2013.01); *Y10S 901/09* (2013.01); *Y10S 901/47* (2013.01)

(56) References Cited

OTHER PUBLICATIONS

Ouellette et al. (Nov. 2007) "A comparison of SLAM implementations for indoor mobile robots." Proc. 2007 IEEE/RSJ Int'l Conf. on Intelligent Robots and Systems, pp. 1479-1484.*

Xu et al. (May 2009) "Ceiling based visual positioning for an indoor mobile robot with monocular vision." IEEE Trans. on Industrial Electronics, vol. 56 No. 5, pp. 1617-1628.*

* cited by examiner (a)          (b)

(a)                  (b)

ROBOT CLEANER AND CONTROLLING METHOD OF THE SAME

This application is a 35 U.S.C. §371 National Stage entry of International Application No. PCT/KR2011/004914 filed on Jul. 5, 2011, and claims priority of Korean Application No. 10-2010-0067112 filed on Jul. 12, 2010, all of which are incorporated by reference in their entirety herein.

TECHNICAL FIELD

The present invention relates to a robot cleaner capable of precisely recognizing a position thereof with using an image detecting unit such as an upper camera, and a controlling method of the same.

BACKGROUND ART

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region. This robot cleaner is provided with a chargeable battery, and is provided with an obstacle sensor for avoiding an obstacle while moving.

In order for the robot cleaner to clean all regions while autonomously moving, a cleaning map has to be made, and a cleaning region on the cleaning map has to be categorized into a region to be cleaned or a region having been cleaned. This determination is generally performed by a precise control performance of the robot cleaner. Generally, the robot cleaner adopts a cheap control sensor with consideration of a product size, the cost, and so on.

DISCLOSURE OF INVENTION

Technical Problem

Therefore, an object of the present invention is to provide a robot cleaner capable detecting a plurality of images with using an image detecting unit such as an upper camera, extracting two or more feature points from the plurality of images, and matching the extracted feature points with each other, and a controlling method of the same.

Another object of the present invention is to provide a robot cleaner capable of precisely recognizing a position thereof based on a matching result between two or more feature points, and a controlling method of the same.

Still another object of the present invention is to provide a robot cleaner capable of creating a feature point set consisting of two or more feature points from a plurality of images, and capable of matching the feature points or the feature point sets with each other by comparing information on the feature points included in the feature point set, and a controlling method of the same.

Still another object of the present invention is to provide a robot cleaner capable of precisely recognizing a position thereof based on a matching result between feature points or between feature point sets, and a controlling method of the same.

Solution to Problem

To achieve these and other advantages and in accordance with the purpose of the present invention, as embodied and broadly described herein, there is provided a robot cleaner, including: an image detecting unit configured to detect a plurality of images by capturing peripheral circumstances; a feature point extracting unit configured to extract a plurality of feature points with respect to each of the plurality of images, and to create a feature point set consisting of the plurality of feature points; a feature point matching unit configured to match the feature points with each other through comparisons; and a control unit configured to recognize a position of the robot cleaner based on a matching result.

According to another embodiment of the present invention, the robot cleaner may further include an obstacle detecting unit configured to detect a peripheral obstacle. The control unit may be configured to create a map based on the obstacle, and to establish (set) a cleaning path or a running path based on the map. The control unit may be configured to correct the cleaning path or the running path based on the position of the robot cleaner, and to perform a cleaning operation based on the corrected cleaning path or to run based on the corrected running path.

The feature point matching unit may be configured to match the feature points with each other based on changes of the orientation vector and the orientation angle. The feature point extracting unit may be configured to calculate a distance between the feature points, and to create a feature point set consisting of feature points having a distance less than a predetermined distance.

According to still another embodiment of the present invention, the robot cleaner may further include a driving unit configured to move the robot cleaner by driving wheels. The image detecting unit may be configured to detect the plurality of images while the robot cleaner is moving.

According to yet still another embodiment of the present invention, the robot cleaner may further include a storage unit configured to store therein at least one of the plurality of images, the feature points and the feature point sets.

To achieve these and other advantages and in accordance with the purpose of the present invention, as embodied and broadly described herein, there is also provided a method for controlling a robot cleaner, the method including: extracting a plurality of feature points with respect to each of a plurality of images, creating a feature point set consisting of the feature points, comparing the feature points with each other, and recognizing a position of a robot cleaner based on a matching result between the feature point sets.

According to another embodiment of the present invention, the method for controlling a robot cleaner includes an image detecting step of detecting a plurality of images by capturing peripheral circumstances, a feature point extracting step of extracting a plurality of feature points with respect to each of the plurality of images, a feature point set creating step of creating a feature point set consisting of the plurality of feature points, a feature point matching step of matching the feature points with each other through comparisons, and a position recognizing step of recognizing a position of the robot cleaner based on a matching result.

According to still another embodiment of the present invention, the method for controlling a robot cleaner includes an obstacle detecting step of detecting a peripheral obstacle, a map creating step of creating a map based on the obstacle, a path establishing step of establishing a cleaning path or a running path based on the map, a path correcting step of correcting the cleaning path or the running path based on the position of the robot cleaner, and a cleaning or running executing step of executing a cleaning operation or a running operation based on the corrected cleaning path or running path.

Advantageous Effects of Invention

The robot cleaner and the controlling method of the same according to the present invention may have the following advantages.

Firstly, the robot cleaner may precisely recognize a position thereof based on two or more feature points extracted from a plurality of images.

Secondly, the robot cleaner may detect a plurality of images through an image detecting unit such as an upper camera, extract two or more feature points from the plurality of images, and create a feature point set consisting of the feature points. Then, the robot cleaner may match the feature point sets with each other by comparing the feature points included in the feature point sets with each other. This may allow the robot cleaner to precisely recognize a position thereof.

Thirdly, the robot cleaner may perform a cleaning operation or a running operation by interworking a precisely recognized position with a map. This may enhance efficiency of a cleaning operation or a running operation, and efficiency of a system.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Figure 3:
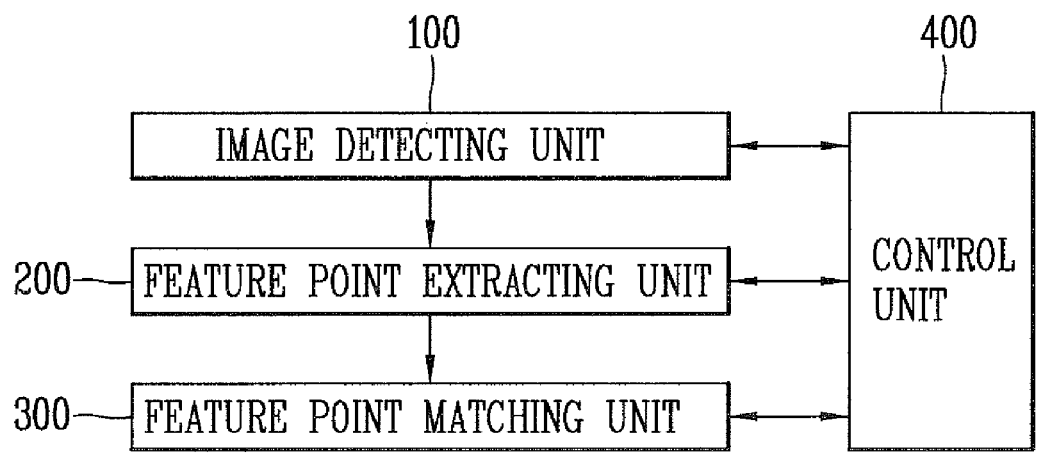
FIGS. 3 to 5 are block diagrams schematically illustrating a configuration of a robot cleaner according to the present invention.

Referring to FIG. 3, a robot cleaner according to one embodiment of the present invention comprises an image detecting unit 100, a feature point extracting unit 200, a feature point matching unit 300 and a control unit 400. The image detecting unit 100 is configured to detect a plurality of images by capturing peripheral circumstances. The feature point extracting unit 200 is configured to extract one or more feature points with respect to each of the plurality of images, and to create a feature point set consisting of the plurality of feature points. The feature point matching unit 300 is configured to match the feature points with each other through comparisons. The control unit 400 is configured to recognize a position of the robot cleaner based on a matching result between the feature points.

Figure 1:
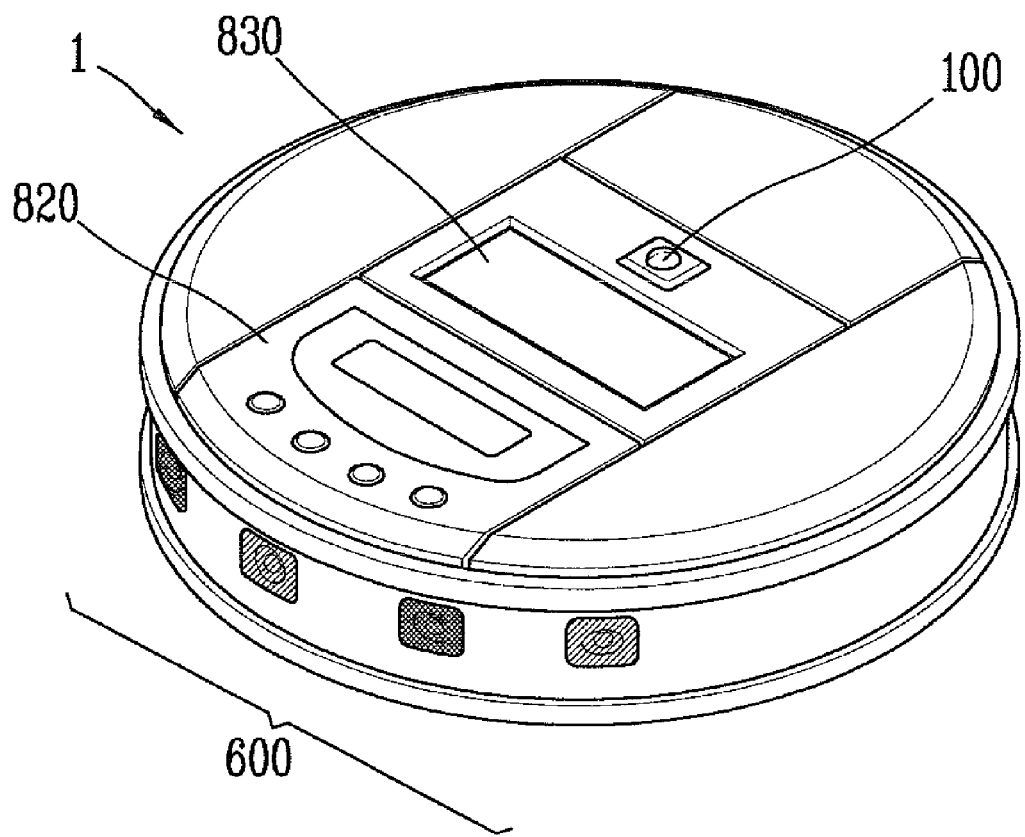
FIG. 1 is a perspective view schematically illustrating the appearance of a robot cleaner according to the present invention.
Figure 2:
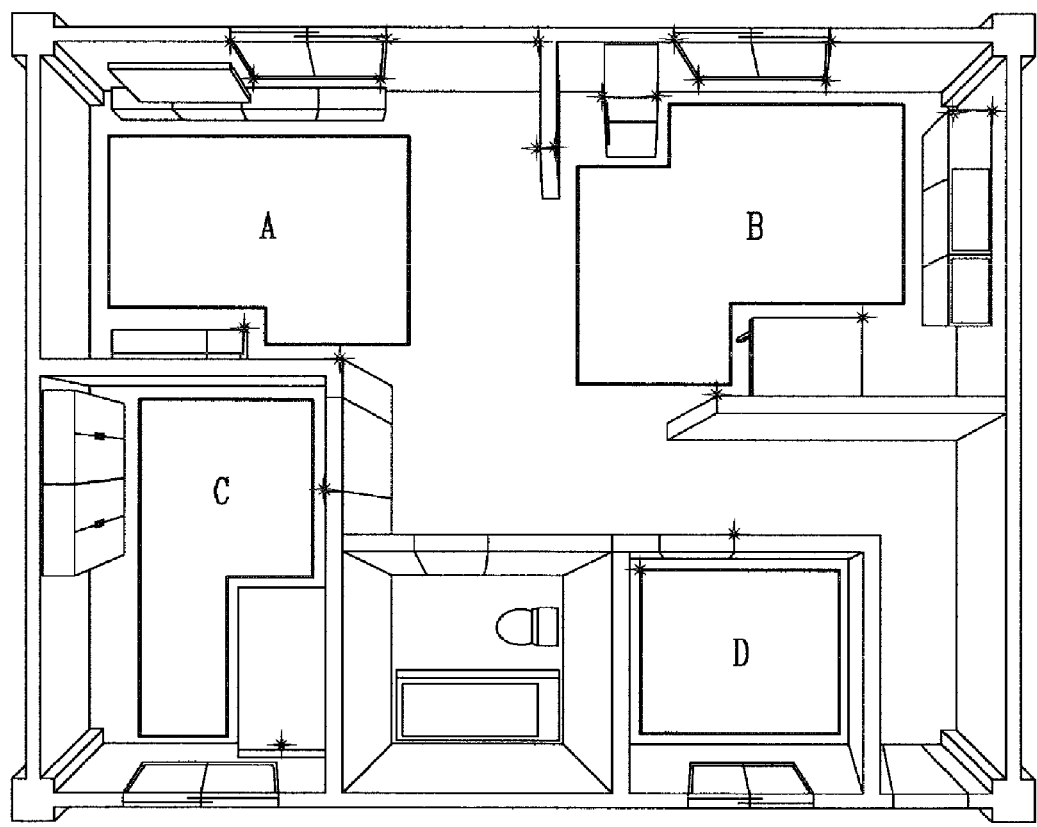
FIG. 2 is a view for explaining an operation to extract feature points according to the present invention.

As shown in FIG. 1, the image detecting unit 100 is implemented as an upper camera installed above the robot cleaner, and configured to detect an upper image by capturing an upper side. Alternatively, the image detecting unit 100 may be implemented as a front camera configured to detect a front image by capturing a front side. Referring to FIG. 2, the feature points indicate images detected by the image detecting unit 100, the images such as a ceiling positioned at an upper side, a fluorescent lamp positioned at a front side and an interior structure. The image detecting unit 100 may include a lens. As the lens, preferably used is a lens having a wide viewing angle so that all regions of an upper side or a front side, e.g., all regions of a ceiling can be captured. For instance, the lens may have a viewing angle more than 160°.

The feature point extracting unit 200 is configured to calculate a distance between the feature points, and to create a feature point set consisting of feature points having a distance less than a predetermined distance. Here, the distance indicates not a substantial distance, but a distance on a feature point space. The feature points have a large similarity when a distance therebetween is short. On the other hand, the feature points have a small similarity when a distance therebetween is long. For instance, the feature points may be represented as $(x_{1,i}, y_{1,i})$ or $(x_{2,i}, y_{2,i})$ in FIG. 6. Here, a distance ($\Delta$) between the feature points may be expressed as the following Math FIG. 1.

MathFIG. 1

$$\Delta = \sqrt{(x_{1,i}-x_{2,i})^2 + (y_{1,i}-y_{2,i})^2}$$ [Math.1]

The feature point includes feature point information consisting of a position, an orientation and a descriptor of the feature point on the image, and the descriptor indicates extraction information of the feature point. The position indicates a position on the image, e.g., $(x_{1,i}, y_{1,i})$, $(x_{1,j}, y_{1,j})$, $(x_{2,i}, y_{2,i})$, $(x_{2,j}, y_{2,j})$ in FIG. 6, and $(x_{1,i}, y_{1,i})$, $(x_{1,j}, y_{1,j})$, $(x'_{2,i}, y'_{2,i})$, $(x'_{2,j}, y'_{2,j})$ in FIG. 7. The orientation indicates a direction of a structure from which a feature point has been extracted, or a direction calculated from the image, which corresponds to $\alpha_{1,i}$, $\alpha_{1,j}$, $\alpha_{2,j}$ and $\alpha_{2,j}$ in FIG. 6 and $\alpha_{1,i}$, $\alpha_{1,j}$, $\alpha'_{2,j}$ and $\alpha'_{2,j}$ in FIG. 7. The descriptor indicates a characteristic of the feature point, which corresponds to a matrix of a predetermined size and including the feature point on the image. The descriptor includes a type or a shape of a structure corresponding to a position extracted from the image.

Figure 6:
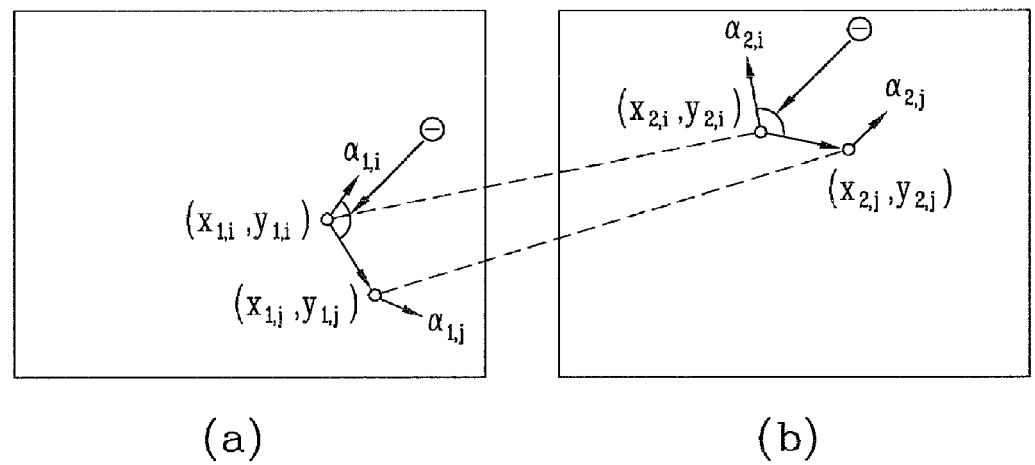
FIGS. 6 and 7 are views for explaining an operation to match feature points with each other according to the present invention.
Figure 7:
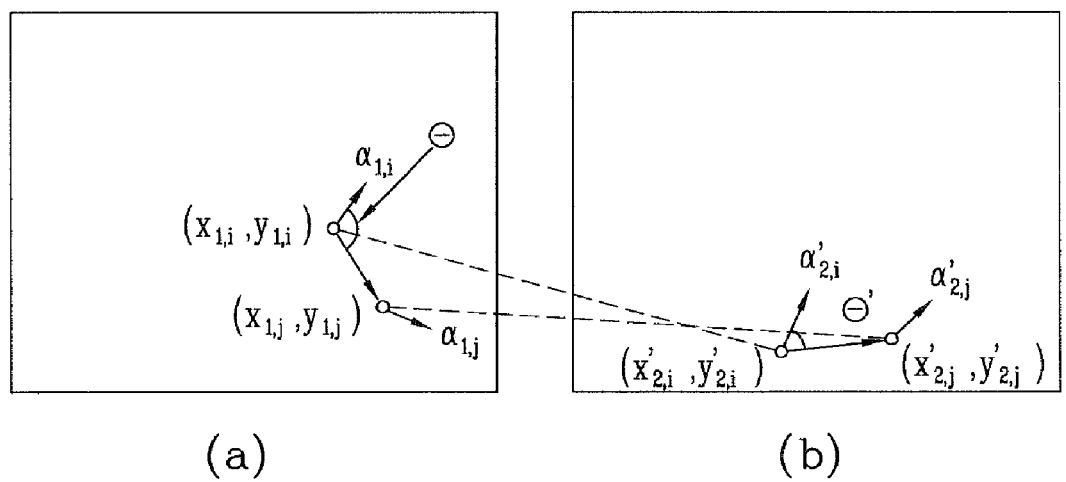

The feature point set is provided with feature point set information consisting of an orientation vector between the feature points and an orientation angle. And, the orientation angle indicates an angle formed between an orientation of each feature point and an orientation vector. Referring to FIGS. 6 and 7, the orientation vector indicates a vector from $(x_{1,i}, y_{1,i})$ to $(x_{1,j}, y_{1,j})$, or from $(x_{2,i}, y_{2,i})$ to $(x_{2,j}, y_{2,j})$, or from $(x'_{2,i}, y'_{2,i})$ to $(x'_{2,j}, y'_{2,j})$. The orientation angle corresponds to $\theta$ or $\theta'$ in FIG. 6 or FIG. 7. The feature point matching unit 300 is configured to match the feature points with each other based on changes of the orientation vector and the orientation angle. For instance, the feature point matching unit 300 matches the feature points with each other when the orientation vector has a length change less than a predetermined displacement, or when the orientation angle has no change or has a change less than a predetermined angle.

The control unit 400 recognizes a position of the robot cleaner based on a matching result between the feature points. More concretely, the control unit 400 determines that the feature points have been matched with each other when the orientation vector has a length change less than a predetermined displacement, or when the orientation angle has no change or has a change less than a predetermined angle. Once two or more feature points included in the feature point set are matched with each other, the control unit 400 recognizes a position change of the robot cleaner through a displacement of the feature points. In case of a feature point set consisting of two feature points, if the two feature points have been matched with each other, the control unit 400 recognizes a position change of the robot cleaner through a displacement of the feature points.

Figure 4:
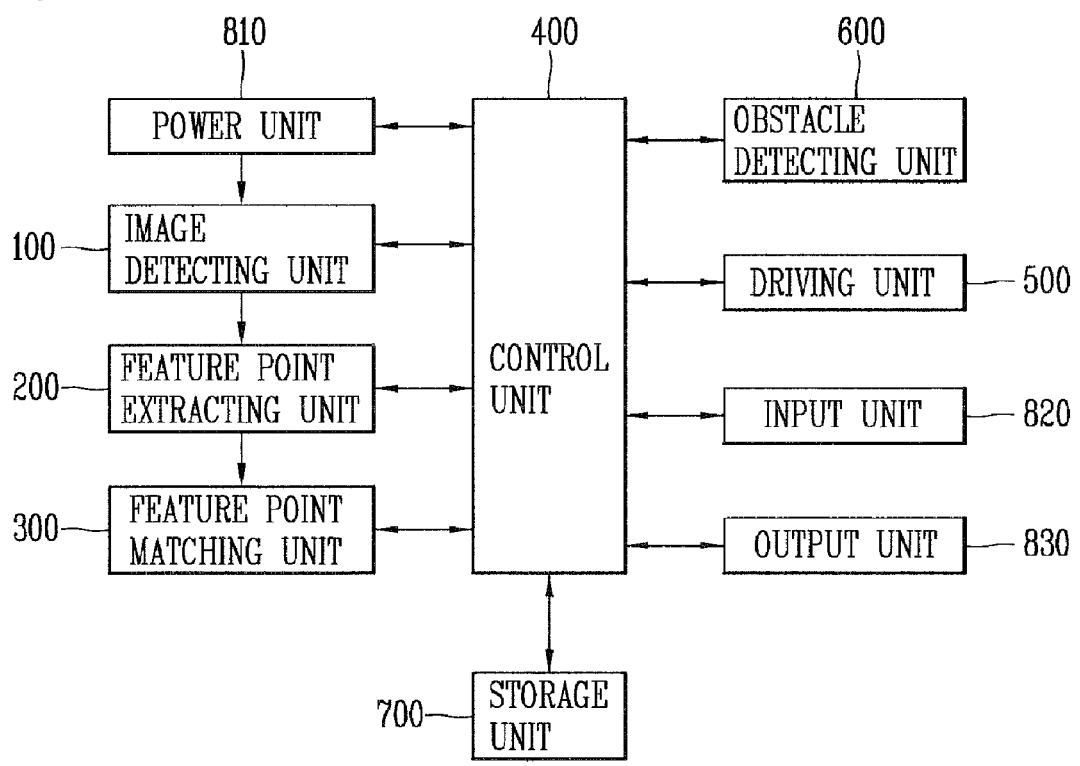

Referring to FIG. 4, a robot cleaner according to another embodiment of the present invention comprises an image detecting unit 100 configured to detect a plurality of images by capturing peripheral circumstances, a feature point extracting unit 200 configured to extract a plurality of feature points with respect to each of the plurality of images, and to create a feature point set consisting of the plurality of feature points, a feature point matching unit 300 configured to match the feature points with each other through comparisons, a control unit 400 configured to recognize a position of the robot cleaner based on a matching result, a driving unit 500 configured to move the robot cleaner by driving wheels, and an obstacle detecting unit 600 configured to detect a peripheral obstacle. Explanations about the same configurations as those in FIG. 3 will be omitted.

The obstacle detecting unit 600 is configured to detect an obstacle in the vicinity of the robot cleaner while the robot cleaner is moving or is performing a cleaning operation at an indoor room such as a house or an office, and to transmit obstacle information including the existence of an obstacle, a position, a size, etc. to the control unit 400. As the obstacle detecting unit 600, may be used an infrared ray sensor, a supersonic wave sensor, a radio frequency (RF) sensor, a bumper, etc. Alternatively, the obstacle detecting unit 600 may be implemented as a position sensitive device (PSD) sensor capable of precisely calculating a distance with using a supersonic wave sensor or an infrared ray triangulation. The obstacle detecting unit 600 may measure a distance between the robot cleaner and a wall surface with using a laser range finder (LRF) for measuring a precise distance by detecting a laser which is reflected after being emitted. Based on the measured distance between the robot cleaner and a wall surface, the obstacle detecting unit 600 may detect a type, a position, etc. of the wall surface. Obstacle information acquired through the obstacle detection unit 600 may be stored in a storage unit 700 to be later explained.

The control unit 400 may be configured to create a map based on the obstacle information acquired through the obstacle detection unit 600, and to establish (set) a cleaning path or a running path based on the map.

The control unit 400 may be configured to correct the cleaning path or the running path based on a position recognized through a matching result between feature points, and based on a position verified with using a matching point or a moving distance, and to perform a cleaning operation based on the corrected cleaning path or to run based on the corrected running path.

The driving unit 500 is configured to move the robot cleaner by driving a wheel motor for rotating a plurality of main wheels and one or more auxiliary wheels. While being moved by the driving unit 500, the robot cleaner detects a plurality of images through the image detecting unit 100.

The robot cleaner may further comprise a storage unit 700 configured to store therein information on at least one of the plurality of images, the feature points and the feature point sets. The storage unit 700 may further store therein information on obstacles detected while the robot cleaner is moving or is performing a cleaning operation. Furthermore, the storage unit 700 may store therein a plurality of images detected by the image detecting unit 100. The storage unit 700 is preferably implemented as a non-volatile memory. The non-volatile memory (NVM, NVRAM) indicates a storage device capable of maintaining stored information even when no power is supplied. The non-volatile memory includes ROM, a flash memory, a magnetic computer memory device (e.g., hard disk, diskette drive and magnetic tape), an optical disk drive, magnetic RAM (MRAM), phase-change RAM (PRAM), etc. And, the storage unit 700 may further store therein moving information, cleaning information, etc. of the robot cleaner within a cleaning region, and may further include a program for driving the robot cleaner.

The robot cleaner may further include an output unit 830 configured to display images stored in the storage unit 700, feature point information, obstacle information, or a map created by the control unit 400. The output unit 830 may be configured to further display state information including a current state of each component of the robot cleaner, a current cleaning state, etc. The output unit 830 may be implemented as one of a Light Emitting Diode (LED), a Liquid Crystal Display (LCD), a Plasma Display Panel (PDP) and an Organic Light Emitting Diode (OLED).

The robot cleaner may further include a power unit 810 having a chargeable power supply means and configured to supply power into the robot cleaner. The power unit 810 supplies power necessary for the robot cleaner to move and to perform a cleaning operation. If a current amount remaining in the power supply means (i.e., battery) of the power unit 810 is deficient, the power unit 810 receives a charging current from a charging plate.

The robot cleaner may further include an input unit 820 configured to directly input a control command, or to input a command for instructing output of obstacle information or information stored in the storage unit 700. The input unit 820 includes an OK button for certifying position information such as a position of an obstacle and a position of the robot cleaner, or a map and a cleaning map or a running path. The input unit 820 may be further provided with at least one of a set button for inputting a setting command, a re-set button for inputting a re-setting command, a deletion button, a cleaning start button and a stop button. A user may input a control command through the input unit 820, thereby selecting a sector or a room requiring a cleaning operation from a map displayed on the output unit 830. And, the user may input a control command for establishing (setting) a cleaning pattern, a cleaning order, etc. The input unit 820 and the output unit 830 may be implemented in the form of a touch screen on which both an input and an output can be implemented.

The robot cleaner may further include a position recognizing unit 900 configured to output position information by recognizing a position thereof. As the position recognition unit, may be used at least one of an acceleration sensor (not shown) configured to recognize a speed and a position, an encoder (not shown) connected to a wheel motor for driving wheels of the robot cleaner and configured to detect a speed, and a gyro sensor (not shown) configured to detect a rotation speed of the robot cleaner. The control unit 400 may compensate for a position recognized through a matching result between the feature points, based on a position recognized by the position recognizing unit 900.

Figure 5:
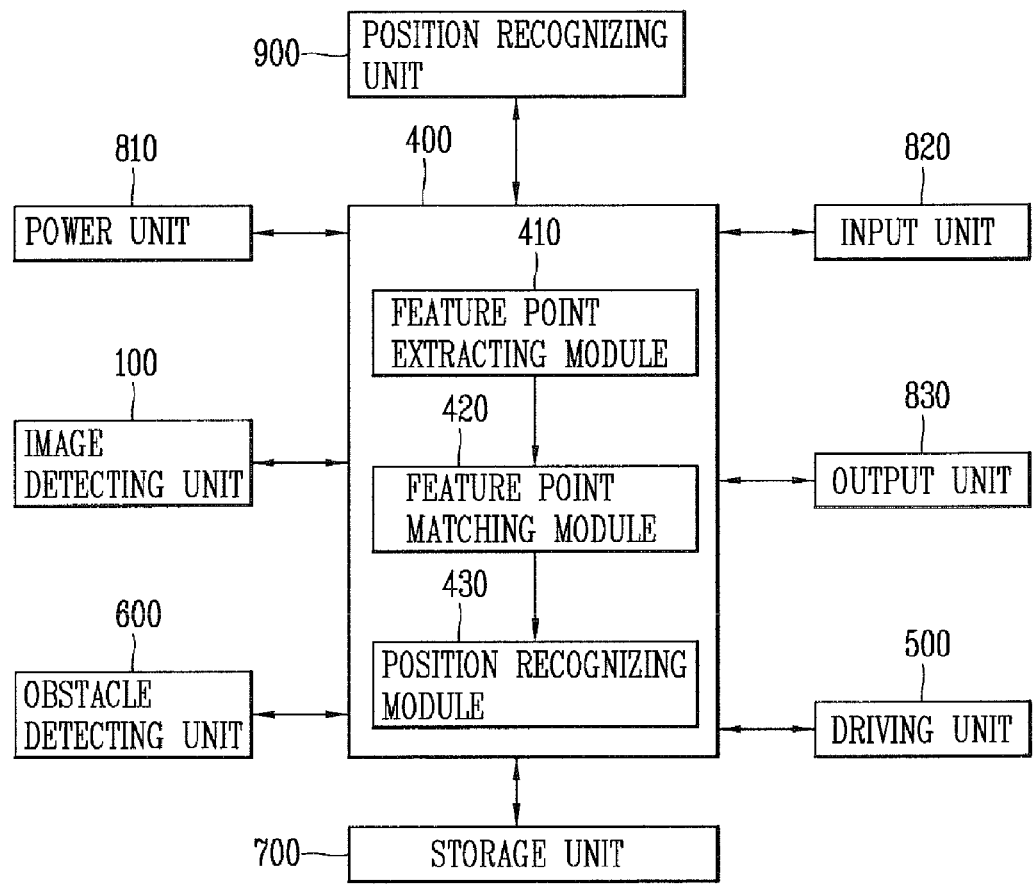

Referring to FIG. 5, a robot cleaner according to still another embodiment of the present invention may comprise the feature point extracting unit 200 and the feature point matching unit 300 of FIG. 3 or FIG. 4 in the form of a feature point extracting module 410 and a feature point matching module 420 of the control unit 400, respectively. More concretely, referring to FIG. 5, the robot cleaner according to still another embodiment of the present invention comprises an image detecting unit 100 configured to detect a plurality of images by capturing peripheral circumstances, and a control unit 400 configured to recognize a position of the robot cleaner based on the detected plurality of images. The control unit 400 includes a feature point extracting module 410 configured to extract a plurality of feature points with respect to each of the plurality of images, and to create a feature point set consisting of the plurality of feature points, a feature point matching module 420 configured to match the feature points with each other through comparisons, and a position recognizing module 430 configured to recognize a position of the robot cleaner based on a matching result.

The robot cleaner may further include a cleaning unit (not shown). The cleaning unit is provided with a suction motor for sucking air and a means for collecting dust, thereby sucking peripheral dust or foreign materials.

Figure 8:
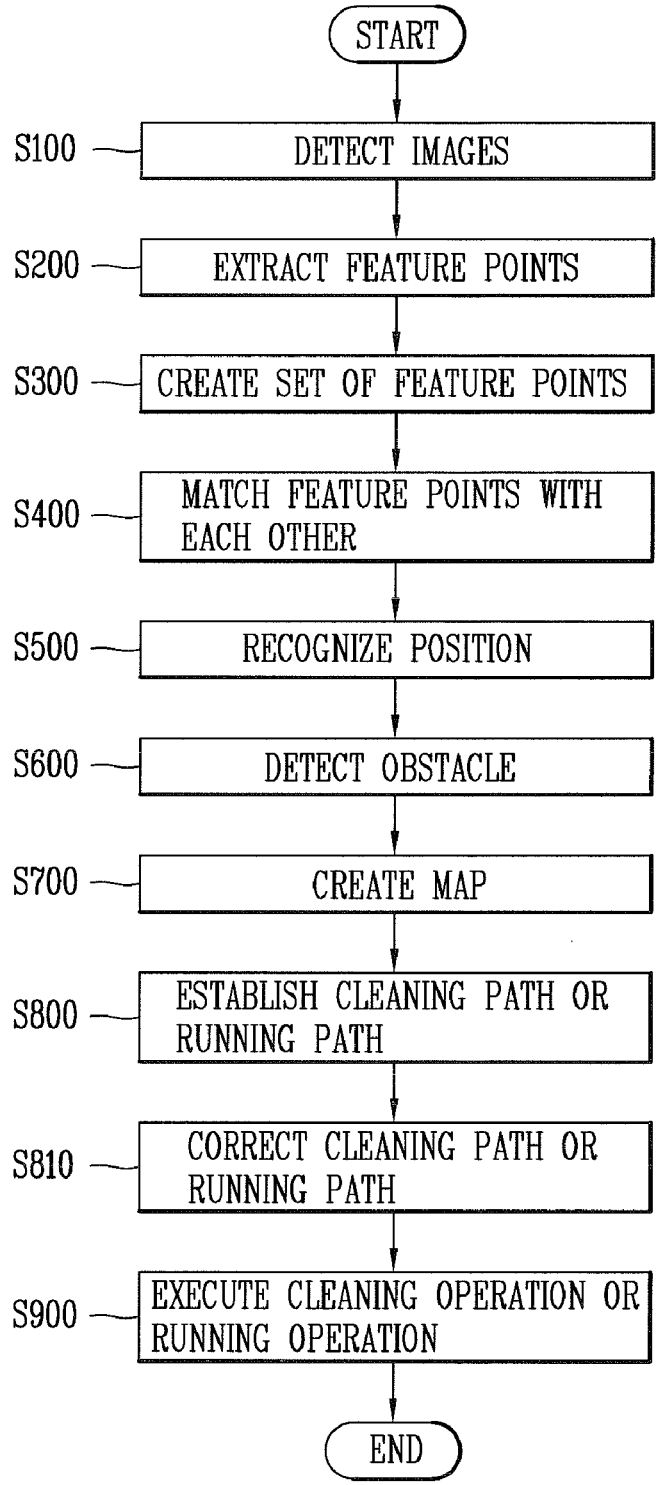
FIGS. 8 and 9 are flowcharts schematically illustrating a method for controlling a robot cleaner according to the present invention.
Figure 9:
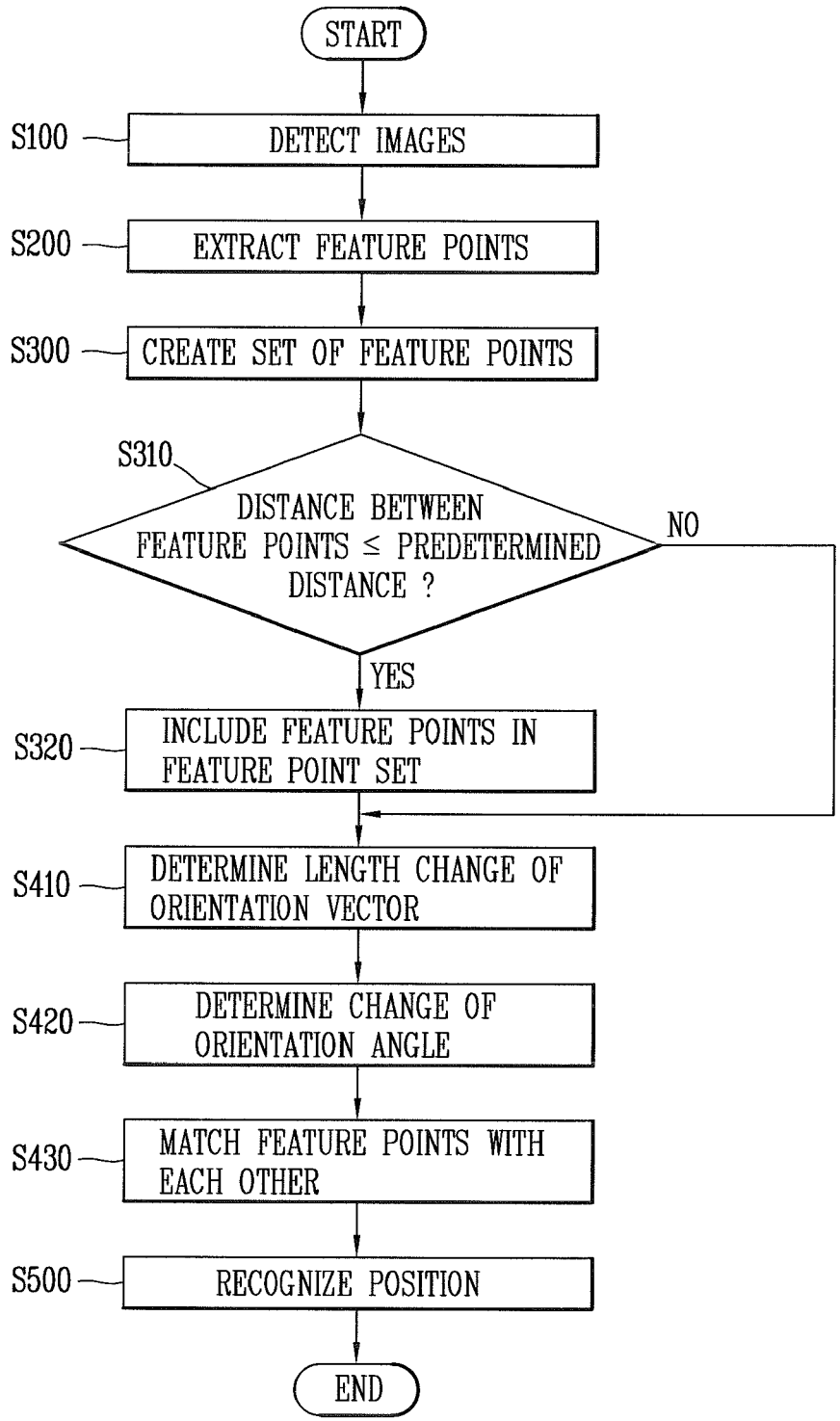

Referring to FIGS. 8 and 9, a method for controlling a robot cleaner according to the present invention comprises extracting a plurality of feature points with respect to each of a plurality of images, creating a feature point set consisting of the feature points, comparing the feature points with each other, and recognizing a position of a robot cleaner based on a matching result between the feature point sets. Since configurations of the respective components have been aforementioned in FIGS. 1 to 5, detailed explanations thereof will be omitted.

Referring to FIG. 8, a method for controlling a robot cleaner according to one embodiment of the present invention comprises an image detecting step (S100) of detecting a plurality of images by capturing peripheral circumstances, a feature point extracting step (S200) of extracting a plurality of feature points with respect to each of the plurality of images, a feature point set creating step (S300) of creating a feature point set consisting of the plurality of feature points, a feature point matching step (S400) of matching the feature points with each other through comparisons, and a position recognizing step (S500) of recognizing a position of the robot cleaner based on a matching result.

Referring to FIG. 9, the feature point matching step (S400) includes determining a length change of an orientation vector (S410), and determining a change of an orientation angle (S420). For instance, the robot cleaner matches the feature points with each other when the orientation vector has a length change less than a predetermined displacement, or when the orientation angle has no change or has a change less than a predetermined angle.

Referring to FIG. 9, the feature point set creating step (S300) includes calculating a distance between the feature points (not shown), comparing the calculated distance with a preset distance (S310), and creating a feature point set based on a result of the comparison (S320). More concretely, the robot cleaner includes the feature points in the feature point set when the calculated distance is less than the preset distance. On the other hand, the robot cleaner excludes the feature points from the feature point set when the calculated distance is more than the preset distance.

Firstly, the robot cleaner is configured to detect a plurality of images through the image detecting unit such as an upper camera for detecting an upper image by capturing an upper side, or a front camera for detecting a front image by capturing a front side (S100). Then, the robot cleaner extracts feature points from the plurality of images including a ceiling positioned at an upper side, a fluorescent lamp positioned at a front side and an interior structure (S200). The robot cleaner calculates a distance between feature points, and creates a feature point set consisting of feature points having a distance therebetween less than a predetermined distance (S300). Here, the distance indicates not a substantial distance, but a distance in a feature point space. The feature points have a large similarity when a distance therebetween is short. On the other hand, the feature points have a small similarity when a distance therebetween is long.

The feature point is provided with feature point information consisting of a position, an orientation and a descriptor thereof on the image, and the descriptor indicates extraction information of the feature point. The position indicates a position of a feature point on the image, e.g., $(x_{1,i}, y_{1,i})$, $(x_{1,j}, y_{1,j})$, $(x_{2,i}, y_{2,i})$ and $(x_{2,j}, y_{2,j})$ in FIG. 6, and $(x_{1,i}, y_{1,i})$, $(x_{1,j}, y_{1,j})$, $(x'_{2,i}, y'_{2,i})$ and $(x'_{2,j}, y'_{2,j})$ in FIG. 7. The orientation indicates a direction of a structure from which a feature point has been extracted, or a direction calculated from the image, which corresponds to $\alpha_{1,i}, \alpha_{1,j}, \alpha_{2,i}$ and $\alpha_{2,j}$ in FIG. 6 and $\alpha_{1,i}, \alpha_{1,j}, \alpha'_{2,i}$ and $\alpha'_{2,j}$ in FIG. 7. The descriptor indicates a characteristic of the feature point, which corresponds to a matrix of a predetermined size and including the feature point on the image. The descriptor includes a type or a shape of a structure corresponding to a position extracted from the image.

The feature point set is provided with feature point set information consisting of an orientation vector between the feature points and an orientation angle. And, the orientation angle indicates an angle formed between an orientation of each feature point and an orientation vector. Referring to FIGS. 6 and 7, the orientation vector indicates a vector from $(x_{1,i}, y_{1,i})$ to $(x_{1,j}, y_{1,j})$, or from $(x_{2,i}, y_{2,i})$ to $(x_{2,j}, y_{2,j})$, or from $(x'_{2,i}, y'_{2,i})$ to $(x'_{2,j}, y'_{2,j})$. The orientation angle corresponds to θ or θ' in FIG. 6 or FIG. 7.

The robot cleaner matches the feature points with each other based on changes of the orientation vector and the orientation angle (S400). For instance, the robot cleaner matches the feature points with each other when the orientation vector has a length change less than a predetermined displacement, or when the orientation angle has no change or has a change less than a predetermined angle. The robot cleaner recognizes a position thereof based on a matching result between the feature points (S500). More concretely, the robot cleaner determines that the feature points have been matched with each other when the orientation vector has a length change less than a predetermined displacement, or when the orientation angle has no change or has a change less than a predetermined angle. Once two or more feature points included in the feature point set are matched with each other, the robot cleaner recognizes a position change thereof through a displacement of the feature points (S500). In case of a feature point set consisting of two feature points, if the two feature points have been matched with each other, the robot cleaner recognizes a position change thereof through a displacement of the feature points (S500).

Referring to FIG. 8, the method for controlling a robot cleaner according to still another embodiment of the present invention further comprises an obstacle detecting step (S600) of detecting a peripheral obstacle, a map creating step (S700) of creating a map based on the obstacle, a path establishing step (S800) of establishing a cleaning path or a running path based on the map, a path correcting step (S810) of correcting the cleaning path or the running path based on the position of the robot cleaner, and a cleaning or running executing step (S900) of executing a cleaning operation or a running operation based on the corrected cleaning path or running path.

The robot cleaner is configured to detect a peripheral obstacle while being moved or performing a cleaning operation (S600), and is configured to create a map based on the obstacle (S700). Then, the robot cleaner is configured to establish a cleaning path or a running path based on the map (S800). Then, the robot cleaner is configured to correct the cleaning path or the running path based on the position (S810), and is configured to execute a cleaning operation or a running operation based on the corrected cleaning path or running path (S900).

As aforementioned, in the robot cleaner and the controlling method of the same according to the present invention, a plurality of images are detected through the image detecting unit such as an upper camera, and two or more feature points are extracted from the plurality of images. Then, a feature point set consisting of the feature points is created, and the feature points included in the feature point set are matched with each other. This may allow the robot cleaner to precisely recognize a position thereof. Furthermore, this may allow the robot cleaner to perform a cleaning operation or a running operation by interworking a precisely recognized position with a map.

The invention claimed is:

1. A robot cleaner, comprising:
   an image detecting unit configured to detect a plurality of images by capturing peripheral circumstances;
   a feature point extracting unit configured to extract a plurality of feature points with respect to each of the plurality of images, and to create a feature point set consisting of the plurality of feature points;
   a feature point matching unit configured to match the feature points with each other through comparisons; and
   a control unit configured to recognize a position of the robot cleaner based on a matching result,
   wherein the feature point comprises feature point information consisting of a position, an orientation and a descriptor of the feature point on the image, and the descriptor indicates extraction information of the feature point,
   wherein the feature point set is provided with feature point set information consisting of an orientation vector between the feature points and an orientation angle,
   wherein the orientation angle indicates an angle formed between the orientation of each feature point and the orientation vector.

2. The robot cleaner of claim 1, wherein the feature point matching unit is configured to match the feature points with each other based on changes of the orientation vector and the orientation angle.

3. The robot cleaner of claim 1, wherein the feature point extracting unit is configured to calculate a distance between the feature points, and to create a feature point set consisting of feature points having a distance less than a predetermined distance.

4. The robot cleaner of claim 1, further comprising a driving unit configured to move the robot cleaner by driving wheels, wherein the image detecting unit is configured to detect the plurality of images while the robot cleaner is moving.

5. The robot cleaner of claim 1, further comprising a storage unit configured to store therein at least one of the plurality of images, the feature points and the feature point sets.

6. The robot cleaner of claim 1, further comprising an obstacle detecting unit configured to detect a peripheral obstacle,
   wherein the control unit is configured to create a map based on the obstacle, and to establish a cleaning path or a running path based on the map.

7. The robot cleaner of claim 6, wherein the control unit is configured to correct the cleaning path or the running path based on the position of the robot cleaner, and to perform a cleaning operation based on the corrected cleaning path or to run based on the corrected running path.

8. The robot cleaner of claim 1, wherein the image detecting unit is implemented as an upper camera installed above the robot cleaner, and configured to detect an upper image by capturing an upper side.

9. A method for controlling a robot cleaner, the method comprising:
   an image detecting step of detecting a plurality of images by capturing peripheral circumstances;
   a feature point extracting step of extracting a plurality of feature points with respect to each of the plurality of images;
   a feature point set creating step of creating a feature point set consisting of the plurality of feature points;
   a feature point matching step of matching the feature points with each other through comparisons; and
   a position recognizing step of recognizing a position of the robot cleaner based on a matching result,
   wherein the feature point comprises feature point information consisting of a position, an orientation and a descriptor of the feature point on the image, and the descriptor indicates extraction information of the feature point,
   wherein the feature point set is provided with feature point set information consisting of an orientation vector between the feature points and an orientation angle,
   wherein the orientation angle indicates an angle formed between the orientation of each feature point and the orientation vector.

10. The method of claim 9, wherein in the feature point matching step, the feature points are matched with each other based on changes of the orientation vector and the orientation angle.

11. The method of claim 9, wherein the feature point set creating step comprises:
    calculating a distance between the feature points;
    comparing the calculated distance with a preset distance; and
    creating a feature point set based on a result of the comparison.

12. The method of claim 9, further comprising:
    an obstacle detecting step of detecting a peripheral obstacle;
    a map creating step of creating a map based on the obstacle;
    a path establishing step of establishing a cleaning path or a running path based on the map;
    a path correcting step of correcting the cleaning path or the running path based on the position of the robot cleaner; and
    a cleaning or running executing step of executing a cleaning operation or a running operation based on the corrected cleaning path or running path.

* * * * *